United States Patent [19]

Armour

[11] 4,248,407
[45] Feb. 3, 1981

[54] CAST HOUSE EMISSIONS RECYCLE SYSTEM

[75] Inventor: Frank K. Armour, Flossmoor, Ill.

[73] Assignee: Interlake, Inc., Oak Brook, Ill.

[21] Appl. No.: 106,088

[22] Filed: Dec. 21, 1979

[51] Int. Cl.³ .............................................. F24F 9/00
[52] U.S. Cl. .................................. 266/156; 266/157; 266/197; 98/115 R
[58] Field of Search ............... 75/41, 42, 25; 266/142, 266/144, 145, 155–159; 98/115 R, 115 LH

[56] References Cited

U.S. PATENT DOCUMENTS

| | | | |
|---|---|---|---|
| 2,345,067 | 3/1944 | Osann | 266/156 |
| 2,790,711 | 4/1957 | Sellers et al. | 75/41 |
| 3,041,059 | 6/1962 | Powell | 266/147 |
| 3,460,934 | 8/1969 | Kelmar | 75/25 |
| 3,834,293 | 9/1974 | Danieli | 266/157 |
| 3,928,023 | 12/1975 | Claflin | 75/25 |

Primary Examiner—M. J. Andrews
Attorney, Agent, or Firm—Vogel, Dithmar, Stotland, Stratman & Levy

[57] ABSTRACT

A cast house emissions recycle system for a blast furnace including a housing surrounding and enclosing the lower portion of the blast furnace and the tap holes and runners therefor and the hot metal ladle associated therewith, structure collecting the emissions from the housing, and a blower having an inlet duct communicating with the collecting structure and an outlet duct communicating with the cold air blast inlet to a hot blast stove for heating the air stream flowing therethrough and returning the heated air stream to the interior of the blast furnace; in an alternative construction, the output from the blower is connected to the combustion chamber of an associated hot blast stove as part of the fuel combustion air input thereto.

28 Claims, 3 Drawing Figures

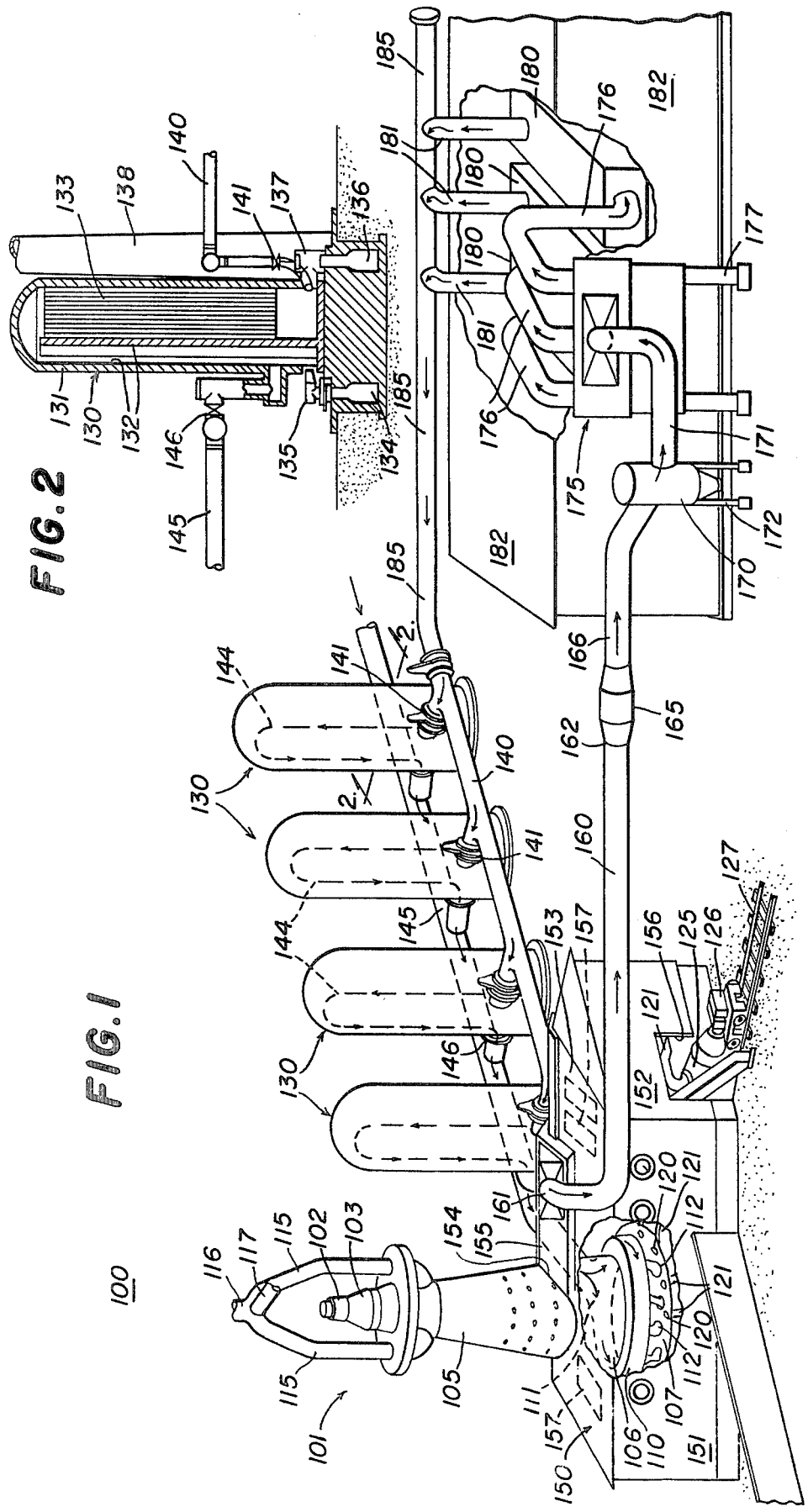

CAST HOUSE EMISSIONS RECYCLE SYSTEM

PRIOR ART STATEMENT AND BACKGROUND OF THE INVENTION

The present invention relates generally to improvements in cast houses for blast furnaces, and specifically to an emissions recycle system for blast furnace cast houses.

A blast furnace in the steel industry is used to melt down iron ore, fluxes for forming slag, and other additions such as manganese ore or phosphoric rock, commonly called the "burden", to extract iron from the iron ore, the iron being in the form of pig iron. There is charged into the furnace in addition to the burden, fuel which is generally coke, and the air blast which is injected into the furnace to burn the fuel and to maintain a sufficiently high temperature to render both the iron metal and the resultant slag freely molten. The air blast at the requisite pressure is provided by a blower, which may be a steam-driven reciprocating engine, a steam-driven turboblower or a gas-driven reciprocating engine. Hot blast stoves are used for heating the air blast and each stove is composed of a mass of brickwork, arranged as checquer work, contained in a steel casing. The temperature of the brickwork is raised to the required level by the combustion of gaseous fuels therein. The gases are then shut off and the air blast from the blower is allowed to pass through the hot blast stoves on its way to the blast furnace. Two or more stoves are required in order that the process may be continuous.

The gases leaving the blast furnace at the top thereof, which gases are particulate laden, are passed through primary dust catchers and ultimately through gas washer towers where they are washed with water before use as one of the fuels fed to the hot blast stoves for heating the brickwork therein. The air which is heated in the hot blast stoves is introduced into the lower portion of the blast furnace for heating the burden which is introduced at the top of the blast furnace and works its way down into the lower portion of the blast furnace as it melts and as hot molten iron and hot molten slag are removed from the furnace. A tap hole is provided in the lower portion of the blast furnace that is opened periodically to allow molten metal to pour from the blast furnace. A cast house is provided adjacent to the blast furnace and contains runners into which the molten metal is poured. The runners in turn direct the molten metal to hot metal ladles or other containers which can then be removed from the cast house for use in steel making or in casting of the pig iron into small pieces called pigs. When the molten metal pours from the blast furnace, fumes are emitted in the cast house, and the total emissions during the process are substantial, and some emissions escape to the atmosphere through the roof monitor of the cast house.

Prior practice has dealt extensively with the collection and cleaning of the fumes from the top of the blast furnace, the following patents being exemplary of such prior art emissions collecting and cleaning systems: U.S. Pat. No. 2,345,067 granted Mar. 28, 1944 to B. Osann; U.S. Pat. No. 2,790,711 granted Apr. 30, 1957 to F. B. Sellers et al.; U.S. Pat. No. 3,041,059 granted June 26, 1962 to R. A. Powell; U.S. Pat. No. 3,460,934 granted Aug. 12, 1969 to J. J. Kelmar; and U.S. Pat. No. 3,928,023 granted Dec. 23, 1975 to H. B. Claflin. The problems of dealing with the fume emissions from the cast house monitor has not been successfully dealt with heretofore. Further, these prior systems are expensive because they require high volume blowers which consume large amounts of energy. They also require large spaces because of the use of large filter systems which also are expensive to install and operate.

BRIEF SUMMARY OF THE INVENTION

The present invention provides an emissions recycle system for collecting the fumes generated during the casting of molten metal and molten slag from a blast furnace in a cast house into containers therefor.

It is the principal object of the invention to provide a cast house emission recycle system which does not require any substantial additional energy for its operation beyond what is already employed in the normal blast furnace system operation.

This is accomplished in the present invention, and it is an object of the present invention to accomplish these desired results, by providing a cast house emissions recycle system including a blast furnace having an inlet communicating with the interior of the blast furnace, a plurality of hot blast stoves adjacent to the blast furnace and having inlets for cold air and inlets for fuel and having outlets for hot air communicating with the inlet of the blast furnace and outlets for combustion gases communicating with the atmosphere, the blast furnace having a metal tap hole and runner for withdrawing molten metal from the hearth and pouring it into an associated hot metal ladle, a cast house including a housing surrounding and enclosing at least the lower portion of the blast furnace and surrounding and enclosing the metal tap hole and runner and the associated hot metal ladle, collecting structure associated with the housing for collecting the emissions from the withdrawing of molten metal from the blast furnace through the tap hole and the conveying of the molten metal along the runner and into the associated hot metal ladle, and a blower having an inlet duct communicating with the collecting structure and an outlet duct communicating with one of the inlets to the hot blast stoves for conveying the emissions from the housing to the hot blast stoves.

Another object of the invention is to provide a cast house emissions recycle system of the type set forth wherein the hot blast stoves have a cold blast main with an inlet and an outlet communicating with the hot blast stoves and having a hot blast main with an inlet communicating with the hot blast stoves and an outlet communicating with the inlet to the associated blast furnace, and a blower having an inlet duct communicating with the collecting structure and an outlet duct communicating with the inlet to the cold blast main for conveying the emissions from the housing through the hot blast stoves back to the blast furnace.

Yet another object of the invention is to provide a cast house emissions recycle system of the type set forth wherein the hot blast stoves have a fuel inlet and combustion gas outlet communicating with the atmosphere, and a fan having an inlet duct communicating with the collecting structure and and outlet duct communicating with the fuel inlet to the hot blast stoves for conveying the emissions from the housing into the hot blast stoves and from the hot blast stoves to the atmosphere.

Still another object of the invention is to provide a cast house emissions recycle system of the type set forth wherein there is incorporated into the inlet duct from the collecting structure an axial fan to overcome any friction losses in the inlet duct and to deliver the emissions to the furnace blower at ambient pressure.

Yet another object of the invention is to provide a cast house emissions recycle system of the type set forth and further including in the inlet duct a drop box to remove course particles from the emission stream flowing therethrough and a filter house connected in series in the inlet duct to remove particles from the emission stream flowing therethrough.

A further object of the invention is to provide as a modification to existing blast furnaces, an improved cast house with housing and collecting structure and using the existing furnace blower to create thereby a cast house emissions recycle system of the type set forth above.

Further features of the invention pertain to the particular arrangement of the parts of the cast house emissions recycle system, whereby the above outlined and additional operating features thereof are attained.

The invention, both as to its organization and method of operation, together with further features and advantages thereof will best be understood with reference to the following specification taken in connection with the accompanying drawings.

BRIEF DESCRIPTION OF THE DRAWINGS

FIG. 1 is a diagrammatic and perspective view of a first embodiment of a cast house emissions recycle system made in accordance with and embodying the principles of the present invention, this embodiment of the system taking the cast house emissions and conveying them through the hot blast stoves and back to the bustle of the blast furnace for recycling thereof;

FIG. 2 is a fragmentary view in vertical section through one of the hot blast stoves in the blast furnace system as viewed in the direction of the arrows along the line 2—2 in FIG. 1.

DETAILED DESCRIPTION OF THE PREFERRED EMBODIMENT

Figure 3:
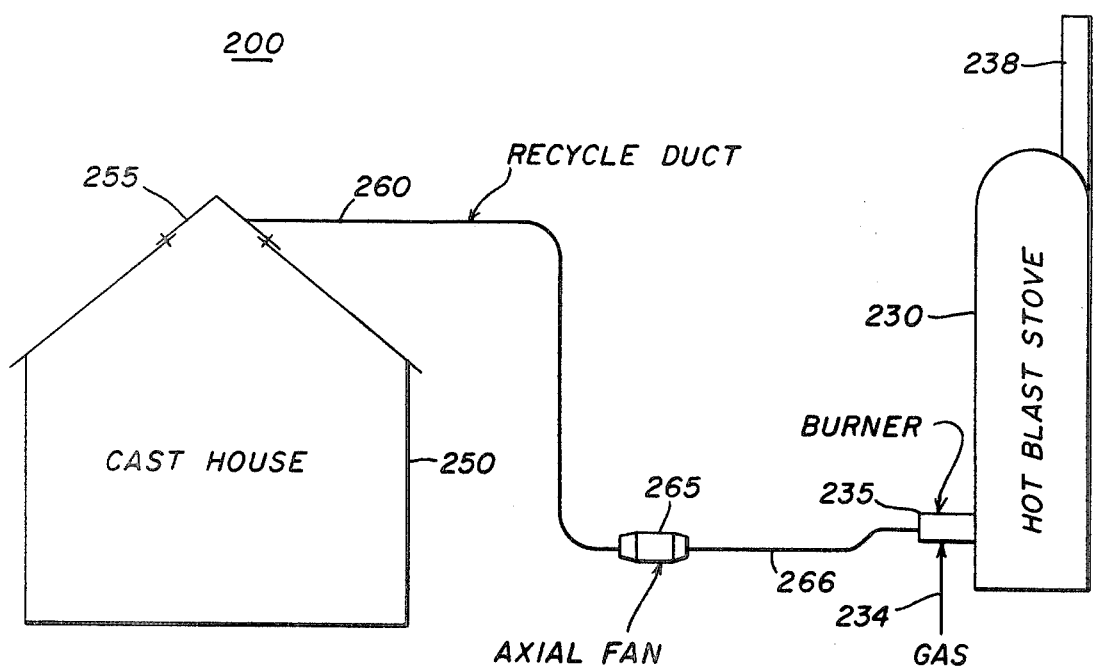
FIG. 3 is a diagrammatic view of a second preferred embodiment of the invention wherein the cast house emissions are fed through the hot blast stoves as part of the fuel combustion air input thereto.

Referring to FIGS. 1 and 2 of the drawings, there is illustrated in FIG. 1 of the drawings a first preferred embodiment of a cast house emissions recycle system generally designated by the numeral 100 and made in accordance with and embodying the principles of the present invention. The system includes a standard blast furnace 101 of the type used to reduce iron ore to pig iron as has been briefly described hereinabove. The blast furnace includes a vertically upstanding stack 105 supported by a metallic frame (not shown) and resting at its bottom end upon a bosh 106 that in turn rests upon a hearth 107, all of the stack, the bosh and the hearth being essentially circular in cross section with the stack flaring downwardly and outwardly, the bosh flaring downwardly and inwardly and the hearth being essentially cylindrical in shape.

Disposed at the upper end of the stack 105 is the mechanism for inserting the charge or "burden" of iron ore and slag producing materials and fuel into the blast furnace 101, there being provided more specifically a charging hopper 102 of the usual type that empties into a double bell distributor 103 of the usual construction. Arranged about the bosh 106 is the usual bustle 110 having an inlet 111 connected to a hot blast main that will be described more fully hereinafter and having connected also thereto a plurality of tuyeres 112 disposed essentially equidistantly therearound and entering into the blast furnace 101 at essentially the juncture of the bosh 106 and the hearth 107. Injection of hot air from the bustle 110 into the tuyeres 112 causes a stream of gases to rise upwardly through the bosh 106 and the stack 105, the resultant combustion products and any entrained particulate matter being collected at the top of the blast furnace 101, and delivered by means of uptake pipes 115 to a collecting chamber 116 and then outwardly through a downcomer 117 to a particulate removal and scrubbing apparatus (not shown).

The product from the blast furnace 101 is molten metal or pig iron that is removed therefrom through one or more tap holes 120 that empty into runners 121 in the associated cast house housing 150. The runners 121 convey the hot molten metal to a hot metal ladle 125 disposed in the cast house housing 150 and mounted upon a car 126 supported by railway tracks 127. In this manner, the hot metal ladle 125 can be readily filled with molten pig iron from the blast furnace 101, and thereafter carried by its associated railway car 126 to the next processing step which may be either a casting house for casting pigs or to a further refining step in the production of a steel.

The hot air blast required in the bustle for the proper operation of the blast furnace 101 is derived from a plurality of hot blast stoves 130, four of the stoves 130 being illustrated. It will be understood that at least two of the stoves 130 are required for continuous operation of the blast furnace 101, and more than four of the hot blast stoves 130 may be utilized if desired. The details of construction of one of the hot blast stoves 130 is best illustrated in FIG. 2 of the drawings, wherein it will be seen that the stove 130 includes a generally cylindrical covered metal wall 131 that is lined with firebrick 132, the firebrick 132 also being utilized to provide the necessary partitions within the stove 130. Disposed within the metal wall 131 is a checquer chamber 133 formed of bricks which are heated in the operation of the stoves 130 to impart heat thereto which is thereafter utilized to warm cold air to provide the hot air blast for the blast furnace 101. In the operation of the stoves 130, the bricks in the checquer chamber 133 are first heated to a high temperature utilizing combustible gases derived from a gas flue 134 and burned in a gas burner 135. The combustion gases from the gas burner 135 after imparting the heat content thereof to the bricks in the checquer chamber 133 are withdrawn through a chimney flue 136 containing a chimney valve 137 and into a chimney 138 which exhausts the gases into the atmosphere.

After the bricks in the checquer chamber 133 have been heated to the proper operating temperature, the supply of gas to the burner 135 is interrupted and the chimney valve 137 closed. Cold air is then supplied to the hot blast stoves 130 through a cold blast main 140 which supplies the cold air to all of the hot blast stoves 130 through individual air blast valves 141. The cold air passes through the stoves 130 as illustrated by the arrows 144 in FIG. 1, and more specifically through the heated bricks in the checquer chamber 133 whereby to be heated thereby and then exit from the hot blast stoves into a hot blast main 145 through individual air blast valves 146. The hot blast main 145 connects with the inlet 111 to the bustle 110 thus to provide hot blast air into the lower portion of the blast furnace 101 in the usual manner.

Periodically the blast furnace 101 has the pig iron removed therefrom by tapping one of the tap holes 120 and permitting the molten pig iron to enter one of the runners 121 and thus to be deposited in the hot metal ladle 125 as described above. In accordance with the present invention, the cast house housing 150 is constructed so as to collect all of the emissions that occur during the casting of hot metal from the blast furnace 101 and during the casting of hot molten slag therefrom. More specifically, the housing 150 is provided with opposed side walls 151 and opposed end walls 152 covered by a roof 153. The roof 153 extends upwardly a substantial distance along the stack 105 and is sealed therearound as at 154 in the front portion thereof above the blast furance tap holes 120. A monitor enclosure 155 is provided on top of the roof 153 to collect the emissions in the cast house housing 150. It is necessary to provide an opening 156 in one of the end walls 152 in order to permit the passage of the hot metal ladles 125 on the associated cars 126 in and out of the cast house housing 150. There further are provided within the housing 150 baffles 157 which are provided to prevent dust laden air out the front end of the cast house 150 beyond the runners 121. The housing 150 is closed above the operating floor thereof so that the hot dirty air rises and is exhausted through the monitor enclosure 155.

Connected to the monitor enclosure 155 and communicating with the interior of the housing 150 is a recycle duct 160 having an inlet 161 connected to the monitor enclosure 155. The recycle duct 160 has an outlet 162 that is connected as to the input of an axial fan 165 that has the outlet thereof connected to a duct 166. The axial fan 165 is of the low pressure type and is provided in the recycle duct 160 to overcome any friction losses that occur in the recycle duct 160, whereby to deliver the air from the housing 150 to blowers to be described more fully hereinafter at ambient pressure.

The duct 166 connects to a drop box 170 mounted upon a support frame 172 and connected to an outlet duct 171. The drop box 170 serves to remove any coarse particles from the stream of emissions flowing through the recycle duct 160 and the axial fan 165. The duct 171 connects to the input to a filter house 175 mounted upon a support frame 177 and which is provided to remove fine particles from the emissions stream flowing therethrough. The output from the filter house 175 as illustrated flows through three outlet ducts 176 which respectively connect to the input to three turbo-blowers 180. The outlets from the turbo-blowers 180 are connected by outlet ducts 181 to a collector duct 185. The collector duct 185 is connected to the inlet to the cold blast main 140. A housing 182 is provided around the turbo-blowers 181.

As has been explained above, the axial fan 165, if necessary, provides sufficient boost to the pressure of the stream of emissions through the recycle duct 160 so that the emissions stream after passing the drop box 170 and the filter house 175 arrives at the inlet to the turbo-blowers 180 through the ducts 176 at essentially ambient pressure. The turbo-blowers 180 provide the suction, as well as providing the pressure to move the air through the cold blast main 140, the hot blast stoves 130, the hot blast main 145, and the bustle 110 back to the interior of the blast furnace 101. In this manner, the air carrying all emissions drawn from the cast house housing 150 are returned to the blast furnace 101 through the hot blast stove 130 as part of the hot blast in the hot blast main 145.

The operation of the cast housing emissions recycle system will now be described in detail. Assuming that the blast furnace 101 is operating and has been operating for some time, one or more of the hot blast stoves 130 will have been heated to the air heating temperature thereof; more specifically, the bricks in the checquer chamber 133 will have been heated to an elevated temperature. The associated air blast valves 141 and 146 will be opened for the heated hot blast stove 130 so that the cold air derived from the cold air main 140 is heated thereby and is blown through the hot blast main 145 into the bustles 110 and then through the tuyeres 112 into the blast furnace 101 at essentially the juncture of the bosh 106 and the hearth 107. The blast furnace 101 has been periodically charged with the proper burden through the charging hopper 102 and the double bell distributor 103. As a consequence, the blast furnace 101 is producing molten pig iron and molten slag that are collected in the hearth 107.

Simultaneously, certain of the hot blast stoves 130 are being heated by means of the combustible gases flowing from the gas flue 134 to the gas burner 135 where the combustible gases are burned to provide a heated air stream that flows through the hot blast stove 130 and specifically the bricks in the checquer chamber 133, so as to heat the bricks in the checquer chamber 133 to an air heating temperature. During this heating operation of the hot blast stove 130, the air blast valves 141 and 146 are closed while the valve for the gas burner 135 and the chimney valve 137 are open. It is emphasized that certain of the hot blast stoves 130 are always in the process of being heated while the remaining hot blast stoves are in the process of heating cold air to supply the necessary hot blast air through the hot blast main 145 to the blast furnace 101.

At all times when the blast furnace 101 is operating, air is being drawn into the housing 150 and through the housing 150 to the monitor enclosure 155 and from the monitor enclosure 155 into the recycle duct 160 and through the axial fan 165. This stream of air picks up any emissions including noxious gases and particulate matter that may be present in the housing 150. The larger or coarser particulate matter is removed from this cold air stream in the drop box 170 and the fine particulate matter is removed from this air stream in the filter house 175. The filtered cold air stream enters the inlets to the turbo-blowers 180 which impart a substantial pressure boost thereto. The air stream with the greater portion of the particulate matter removed therefrom is then fed under increased pressure into the collector duct 185 and into the cold blast main 140. Only certain ones of the hot blast stoves 130 will be in condition to receive and heat the cold blast stream, and the air blast valves 141 and 146 for those particular hot blast stoves will be opened whereby the cold air stream from the cold blast main 140 will be heated by those hot blast stoves 130 and then conveyed through the open valves 146 to the hot blast main 145. The hot blast air from the main 145 passes into the bustle 110 to be hereby inserted through the tuyeres 112 into the blast furnace 101, all in the usual manner. It will be seen therefore that the described system continually collects the emissions and particulate matter present within the housing 150 and after removing the majority of the particulate matter therefrom returns that air stream through the hot blast stoves 130 to the blast furnace 101 as part of the hot air blast thereto. During the casting or withdrawal of hot metal from the blast furnace 101, a particularly large amount of undesirable emissions are produced that are collected in the monitor enclosure 155 and processed as described above. It will be understood that the cold air stream from the collector duct 185 and the cold blast main 140 is periodically shifted from one of the hot blast stoves 130 to another so as always to heat the cold air stream before supplying the same to the hot blast main 145.

It will be seen that this invention therefore serves to collect all the obnoxious emissions associated with the cast house housing 150 and to remove the particulate matter therefrom and to redirect the remaining noxious fumes and gases back into the blast furnace 101 after the heating thereof in the hot blast stoves 130. The existing turbo-blowers 180 are utilized for evacuating the collection structure including the monitor enclosure 155 and passing the collected gases and fumes through the scavenger-type low pressure drop collector or filter house 175 so as to protect the turbo-blowers 180. The drop box 170 is an added scavenger to remove particles also to protect the turbo-blowers 180. The axial flow fan 165 is provided to overcome the pressure drop of the system if the capacity of the turbo-blowers 180 requires such assistance.

There is shown in FIG. 3 of the drawings a second preferred embodiment of the invention, and specifically a cast house emissions recycle system generally designated by the numeral 200. The cast house, generally designated by the numeral 250, is of the same construction as the cast house 150 described above and operates in the same manner. It is provided with a monitor enclosure 255 to collect the emissions in the cast house 250. Connected to the monitor enclosure 255 and communicating with the interior of the cast house 250 is the inlet to a recycle duct 260 which has its outlet connected to the input to an axial fan 265 which is of the same construction and character as the axial fan 165 described above. The outlet of the axial fan 265 is connected to the inlet of a duct 266 that has the outlet end thereof connected as one of the inputs to a burner 235 for a hot blast stove 230. Another input to the burner 235 is a source 234 of gas under pressure and there also may be provided a further air inlet to enhance combustion. There is in fact a plurality of the hot blast stoves 230 which are constructed and operate in the manner of the hot blast stoves 130 described above, the combustion gases from the burner 235 exiting into a chimney 238 which exhaust the gases into the atmosphere. Summarizing the second preferred embodiment 200 of the invention, the gaseous emissions from the cast house 250 are withdrawn through the monitor enclosure 255 and along the recycle duct 260 under the urging of the axial fan 265 and are fed through the duct 266 to the burner 235 as a portion of the air supply thereto. After combustion in the burner 235, the resultant gases are passed through the hot blast stove 230 in the usual manner and then to the atmosphere through the chimney 238.

While there have been described what are at present considered to be the preferred embodiments of the invention, it will be understood that various modifications may be made therein, and it is intended to cover in the appended claims all such modifications as fall within the true spirit and scope of the invention.

What is claimed is:

1. A cast house emissions recycle system comprising a blast furnace having an inlet communicating with the interior of said blast furnace, a plurality of hot blast stoves adjacent to said blast furnace and having inlets for cold air and inlets for fuel and having outlets for hot air communicating with the inlet of said blast furnace and outlets for combustion gases communicating with the atmosphere, said blast furnace having a metal tap hole and runner for withdrawing molten metal therefrom and pouring it into an associated hot metal ladle, a cast house including a housing surrounding and enclosing at least the lower portion of said blast furnace and surrounding and enclosing said metal tap hole and said runner and the associated hot metal ladle, collecting structure associated with said housing for collecting the emissions from the withdrawing of molten metal from said blast furnace through said tap hole and the conveying of the molten metal along said runner and into the associated hot metal ladle, and a blower having an inlet duct communicating with said collecting structure and an outlet duct communicating with one of said inlets to said hot blast stoves for conveying the emissions from said housing to said hot blast stoves.

2. The cast house emissions recycle system set forth in claim 1, wherein said housing has baffles therein to prevent the emissions from escaping to the atmosphere.

3. The cast house emissions recycle system set forth in claim 1, wherein said collecting structure is disposed in the top of said housing.

4. The cast house emissions recycle system set forth in claim 1, and further comprising a fan in said inlet duct to overcome any friction losses in said inlet duct and to deliver the emissions to said blower at ambient pressure.

5. The cast house emissions recycle system set forth in claim 1, and further comprising a drop box in said inlet duct to remove coarse particles therefrom, and a filter house connected in series with said inlet duct to remove fine particles from the emissions.

6. The cast house emissions recycle system set forth in claim 1, wherein a plurality of blowers are provided arranged in parallel with a common inlet duct and a common outlet duct.

7. A cast house emissions recycle system comprising a blast furnace having an inlet communicating with the interior of said blast furnace, a plurality of hot blast stoves adjacent to said blast furnace and having a cold blast main with an inlet and an outlet communicating with said hot blast stoves and having a hot blast main with an inlet communicating with said hot blast stoves and an outlet communicating with the inlet to said blast furnace, said blast furnace having a metal tap hole and runner for withdrawing molten metal therefrom and pouring it into an associated hot metal ladle, a cast house including a housing surrounding and enclosing at least the lower portion of said blast furnace and surrounding and enclosing said metal tap hole and said runner and the associated hot metal ladles, collecting structure associated with said housing for collecting the emissions from the withdrawing of the molten metal from said blast furnace through said tap hole and the conveying of the molten metal along said runner and into the associated hot metal ladle, and a blower having an inlet duct communicating with said collecting structure and an outlet duct communicating with said inlet to said cold blast main for conveying the emissions from said housing through said hot blast stoves and back to said blast furnace.

8. The cast house emissions recycle system set forth in claim 7, wherein said housing has baffles therein to prevent the emissions from escaping to the atmosphere.

9. The cast house emissions recycle system set forth in claim 7, wherein said collecting structure is disposed in the top of said housing.

10. The cast house emissions recycle system set forth in claim 7, and further comprising a fan in said inlet duct to overcome any friction losses in said inlet duct and to deliver the emissions to said blower at ambient pressure.

11. The cast house emissions recycle system set forth in claim 7, and further comprising a drop box in said inlet duct to remove coarse particles therefrom, and a filter house connected in series with said inlet duct to remove fine particles from the emissions.

12. The cast house emissions recycle system set forth in claim 7, wherein a plurality of blowers are provided arranged in parallel with a common inlet duct and a common outlet duct.

13. A cast house emissions recycle system comprising a blast furnace having an inlet communicating with the interior of said blast furnace, a plurality of hot blast stoves adjacent to said blast furnace and having inlets to burners for fuel and air and having outlets for combustion gases communicating with the atmosphere, said blast furnace having a metal tap hole and runner for withdrawing molten metal from said blast furnace and pouring it into an associated hot metal ladle, a cast house including a housing surrounding and enclosing at least the lower portion of said blast furnace and surrounding and enclosing said metal tap hole and said runner and the associated hot metal ladle, collecting structure associated with said housing for collecting the emissions from the withdrawing of molten metal from said blast furnace through said tap hole and the conveying of the molten metal along said runner and into the associated hot metal ladle, and a blower having an inlet duct communicating with said collecting structure and an outlet duct communicating with said air inlets for conveying the emissions from said housing through said hot blast stoves and to the atmosphere.

14. The cast house emissions recycle system set forth in claim 13, wherein said housing has baffles therein to prevent the emissions from escaping to the atmosphere.

15. The cast house emissions recycle system set forth in claim 13, wherein said collecting structure is disposed in the top of said housing.

16. A cast house emissions recycle system for a blast furnace having an inlet and a metal tap hole and runner for withdrawing molten metal therefrom and pouring it into an associated hot metal ladle and a plurality of hot blast stoves adjacent to the blast furnace and having inlets for cold air and inlets for fuel and having outlets for hot air communicating with the inlet to the blast furnace and outlets for combustion gases communicating with the atmosphere, said system comprising a cast house including a housing surrounding and enclosing at least the lower portion of the associated blast furnace and surrounding and enclosing the associated metal tap hole and runner and hot metal ladle, collecting structure associated with said housing for collecting the emissions from the withdrawing of molten metal from the associated blast furnace through the tap hole and the conveying of the molten metal along the associated runner and into the associated hot metal ladle, and a blower having an inlet duct communicating with said collecting structure and an outlet duct communicating with one of the associated inlets to the associated hot blast stoves for conveying the emissions from said housing to the associated hot blast stoves.

17. The cast house emissions recycle system set forth in claim 16, wherein said housing has baffles therein to prevent the emissions from escaping to the atmosphere.

18. The cast house emissions recycle system set forth in claim 16, wherein said collecting structure is disposed in the top of said housing.

19. The cast house emissions recycle system set forth in claim 16, and further comprising a fan in said inlet duct to overcome any friction losses in said inlet duct and to deliver the emissions to the associated hot blast stoves at ambient pressure.

20. A cast house emissions recycle system for a blast furnace having an inlet communicating with the interior thereof and with a metal tap hole and runner for withdrawing molten metal from the blast furnace and pouring it into an associated hot metal ladle and a plurality of hot blast stoves adjacent to the blast furnace and having a cold blast main with an inlet and an outlet communicating with the hot blast stoves and having a hot blast main with an inlet communicating with the hot blast stoves and an outlet communicating with the inlet to the blast furnace, said system comprising a cast house including a housing surrounding and enclosing at least the lower portion of the associated blast furnace and surrounding and enclosing the associated metal tap hole and runner and hot metal ladle, collecting structure associated with said housing for collecting the emissions from the withdrawing of molten metal from the associated blast furnace through the tap hole and the conveying of the molten metal along the associated runner and into the associated hot metal ladle, and a blower having an inlet duct communicating with said collecting structure and an outlet duct communicating with the inlet to the cold blast main for conveying the emissions from said housing through the hot blast stoves and back to the blast furnace.

21. The cast house emissions recycle system set forth in claim 20, wherein said housing has baffles therein to prevent the emissions from escaping to the atmosphere.

22. The cast house emissions recycle system set forth in claim 20, wherein said collecting structure is disposed in the top of said housing.

23. The cast house emissions recycle system set forth in claim 20, and further comprising a fan in said inlet duct to overcome any friction losses in said inlet duct and to deliver the emissions to said blower at ambient pressure.

24. The cast house emissions recycle system set forth in claim 20, and further comprising a drop box in said inlet duct to remove coarse particles therefrom and a filter house connected in series with said inlet duct to remove fine particles from the emissions.

25. The cast house emissions recycle system set forth in claim 20, wherein a plurality of blowers are provided arranged in parallel with a common inlet duct and a common outlet duct.

26. A cast house emissions recycle system for a blast furnace having an inlet and a metal tap hole and runner for withdrawing molten metal from the blast furnace and pouring it into an associated hot metal ladle and a plurality of hot blast stoves adjacent to the blast furnace and having inlets to burners for fuel and air and having outlets for combustion gases communicating with the atmosphere, said system comprising a cast house including a housing surrounding and enclosing at least the lower portion of the associated blast furnace and surrounding and enclosing the associated metal tap hole and runner and hot metal ladle, collecting structure associated with said housing for collecting the emissions from the withdrawing of the molten metal from the associated blast furnace through the tap hole and the conveying of the molten metal along the associated runner and into the associated hot metal ladle, and a blower having an inlet duct communicating with said collecting structure and an outlet duct communicating with the air inlets to the associated hot blast stoves for conveying the emissions from the housing to the associated hot blast stoves and then to the atmosphere.

27. The cast house emissions recycle system set forth in claim 26, wherein said housing has baffles therein to prevent the emissions from escaping to the atmosphere.

28. The cast house emissions recycle system set forth in claim 26, wherein said collecting structure is disposed in the top of said housing.

* * * * *